United States Patent
Koelemeij et al.

(10) Patent No.: US 10,257,798 B1
(45) Date of Patent: Apr. 9, 2019

(54) SYNCHRONIZING CLOCKS IN A WIRELESS SYSTEM

(71) Applicant: OPNT Holding B.V., Amsterdam (NL)

(72) Inventors: Jeroen Cornelis Jean Koelemeij, Amstelveen (NL); James Moscoe Johnson, Jr., Greensboro, GA (US)

(73) Assignee: OPNT HOLDING B.V., Amsterdam (NL)

( * ) Notice: Subject to any disclaimer, the term of this patent is extended or adjusted under 35 U.S.C. 154(b) by 0 days.

(21) Appl. No.: 15/983,972

(22) Filed: May 18, 2018

(51) Int. Cl.
*H04W 56/00* (2009.01)

(52) U.S. Cl.
CPC ..... *H04W 56/0015* (2013.01); *H04W 56/006* (2013.01); *H04W 56/0065* (2013.01)

(58) Field of Classification Search
CPC ........... H04W 56/0015; H04W 56/006; H04W 56/0065
See application file for complete search history.

(56) References Cited

U.S. PATENT DOCUMENTS

| | | | |
|---|---|---|---|
| 7,359,408 B2 | 4/2008 | Kim | |
| 9,094,907 B2* | 7/2015 | Xing | H04W 56/001 |
| 9,331,844 B2 | 5/2016 | Nuijts et al. | |
| 9,344,979 B2 | 5/2016 | Han et al. | |
| 9,883,230 B1 | 1/2018 | Berenberg | |
| 9,913,231 B2* | 3/2018 | Do | H04B 7/2687 |
| 2004/0076187 A1 | 4/2004 | Peled | |
| 2008/0273521 A1 | 11/2008 | Shao et al. | |
| 2013/0230041 A1 | 9/2013 | Han et al. | |
| 2016/0302165 A1* | 10/2016 | Da | H04W 56/002 |
| 2017/0127368 A1* | 5/2017 | Wang | G01S 19/14 |

(Continued)

FOREIGN PATENT DOCUMENTS

| | | |
|---|---|---|
| CN | 101431385 B | 8/2008 |
| WO | 2017200043 A1 | 11/2017 |

(Continued)

OTHER PUBLICATIONS

"IEEE Standard for a Precision Clock Synchronization Protocol for Networked Measurement and Control Systems; IEEE Std 1588-2008 (Revision of IEEE Std 1588-2002) Ed—Anonymous" IEEE Standard; IEEE Piscataway, NJ, USA, Jul. 24, 2008 (Jul. 24, 2008), pp. 1-269, XP017604130. (Year: 2008).*

(Continued)

*Primary Examiner* — Asad M Nawaz
*Assistant Examiner* — Thomas R Cairns
(74) *Attorney, Agent, or Firm* — Perkins Coie LLP

(57) ABSTRACT

Disclosed are methods, devices and systems for generating accurate timestamps for wireless communications signals that can be used to correct the clocks of base stations for wireless communications systems. A radio signal time-stamping unit (RSTU) receives a wireless signal including timing information broadcast by a base station. The RSTU includes a local clock that is in communication with a high-precision time source and provides high-accuracy timing information to one or more base stations to maintain accurate clock synchronization among the plurality of base stations. The timing synchronization information can be determined at least in part based on the propagation delay of the wireless signals received at the RSTU.

29 Claims, 9 Drawing Sheets

(56) References Cited

U.S. PATENT DOCUMENTS

2018/0041977 A1     2/2018    Patel et al.

FOREIGN PATENT DOCUMENTS

| | | |
|---|---|---|
| WO | 2017203522 A1 | 11/2017 |
| WO | 2017204702 A1 | 11/2017 |

OTHER PUBLICATIONS

"Timing and Synchronization for LTE-TDD and LTE-Advanced Mobile Networks," Symmetricon White Paper, 2013, 9 pages, San Jose, CA.

Li, Dr. Han, "Synchronization Requirements of 5G and Corresponding Solutions," China Mobile, Apr. 2017, 22 pages, San Jose, CA.

Robinson, Michael et al., "Topological localization via signals of opportunity," IEEE Transactions on Signal Processing, 12 pages, University of Pennsylvania.

Morales, Joshua J. et al., "Signals of Opportunity Aided Inertial Navigation," Preprint of the 2016 ION GNSS+ Conference, Sep. 12-16, 2016, 10 pages, Portland, OR.

Li, Han et al., "Analysis of the Synchronization Requirements of 5G and Corresponding Solutions," IEEE Communications Standards Magazine, Mar. 2017, pp. 52-58.

Lipinski, Maciej, "White Rabbit," ALBA, Jun. 15, 2012, 86 pages, Institute of Electronic Systems and Warsaw University of Technology.

Van Tour, C. et al., "Sub-Nanosecond Time Accuracy and Frequency Distribution through White Rabbit Ethernet," ngVLA Memo #22, 9 pages, OPNT B.V. and LaserLaB and Department of Physics & Astronomy, Vrije Universiteit Amsterdam, the Netherlands.

Freire, Igor et al., "Analysis and Evaluation of End-to-End PTP Synchronization for Ethernet-based Fronthaul," Global Communications Conference (GLOBECOM), Dec. 2016 IEEE, 6 pages.

Fisher, Kenneth A., "The Navigation Potential of Signals of Opportunity-Based Time Difference of Arrival Measurements," Dissertation, Department of the Air Force Air University, Mar. 2005, 256 pages, Wright-Patterson Air Force Base, Ohio.

\* cited by examiner

SYNCHRONIZING CLOCKS IN A WIRELESS SYSTEM

BACKGROUND

Many elements and systems depend on or benefit from availability of an accurate clock. Cost-effectively getting sufficient clock accuracy to separated locations is often a very difficult challenge. For instance, even if wired connectivity can be established between locations, accurate and cost-effective distribution of clock information is often complex and costly. In addition, maintaining and verifying that clock accuracy in the presence of failures or other disturbances further increases the challenges. Finally, clock accuracy requirements along with the need to certify, continually monitor, and provide traceable results are becoming increasingly more stringent.

Wireless cellular systems include base stations and end nodes. To support time-division duplexing, improve efficient use of time and frequency resources, allow seamless handovers to different cells, reduce inter-symbol interference, and provide many other features and functionalities, the clocks of the base stations in a cellular system should be synchronized. As radio technology continues to improve, including migrating from early versions of 4G LTE, to 4G LTE-A, to 5G, and advanced capabilities are introduced such as precision location services for public safety, the synchronization requirements continue to become more stringent. This includes movement from frequency-only requirements, to timing phase requirements at the base station antenna approaching and even exceeding 35 nanoseconds (nsec). Unfortunately, even if able to initially or during non-fault conditions achieve such accuracy, impairments like oscillator drift and phase noise contribute to errors in time synchronization that decrease efficiency. Further compounding synchronization challenges, the number of base stations needed to support increasing data demands supported by 5G networks, WiFi networks, and other data delivery networks will significantly increase beyond the number of base stations that exist today.

In some previous and existing systems, the Institute for Electrical and Electronic Engineers (IEEE) 1588 Precision Time Protocol (PTP) is used to synchronize base stations via wired connections, typically called backhaul, to the base stations. However, to achieve predictable and accurate results, implementation of PTP also requires deployment of IEEE 1588 hardware at each node between the base station and a master clock which is often located far away within the network. Including the fact that wireless network operators often do not have control of all the nodes providing backhaul service, it is also often expensive to equip all nodes even when the control is available. Even when equipped, accuracy at the base station antenna to the level of approximately 1.5 microseconds (μsec) is typically the best that can be achieved over a metro-sized area, with worse performance as the area is larger. That level of performance does not meet the timing synchronization needs of next generation wireless networks.

In some previous and existing systems and techniques synchronization relies on a Global Positioning System (GPS) receiver at each base station to set the clocks at the base stations. Where GPS receivers provide higher accuracy than IEEE 1588 to the level of approximately 50 nsec, GPS receivers may not provide sufficient clock synchronization to support 5G and other demanding systems in a cost efficient and reliable manner, including in various failure modes. Moreover, service providers in some countries may not be guaranteed GPS service. GPS signals can also be vulnerable to jamming attacks, are ineffective inside buildings and structures, and can be vulnerable to solar flares. Therefore, either relying on GPS receivers that are already in place, or performing expensive upgrades to base stations to equip cases where GPS receiver are not already in place is inadequate to meet the timing synchronization and reliability needs of next generation networks.

In general, existing timing synchronization accuracy of current systems may therefore be insufficient for 5G and other new technologies. Thus, a cost efficient means of providing accurate timing synchronization has great value for existing and upcoming wireless networks, as well as for enabling future technologies and applications.

DETAILED DESCRIPTION

Figure 1:
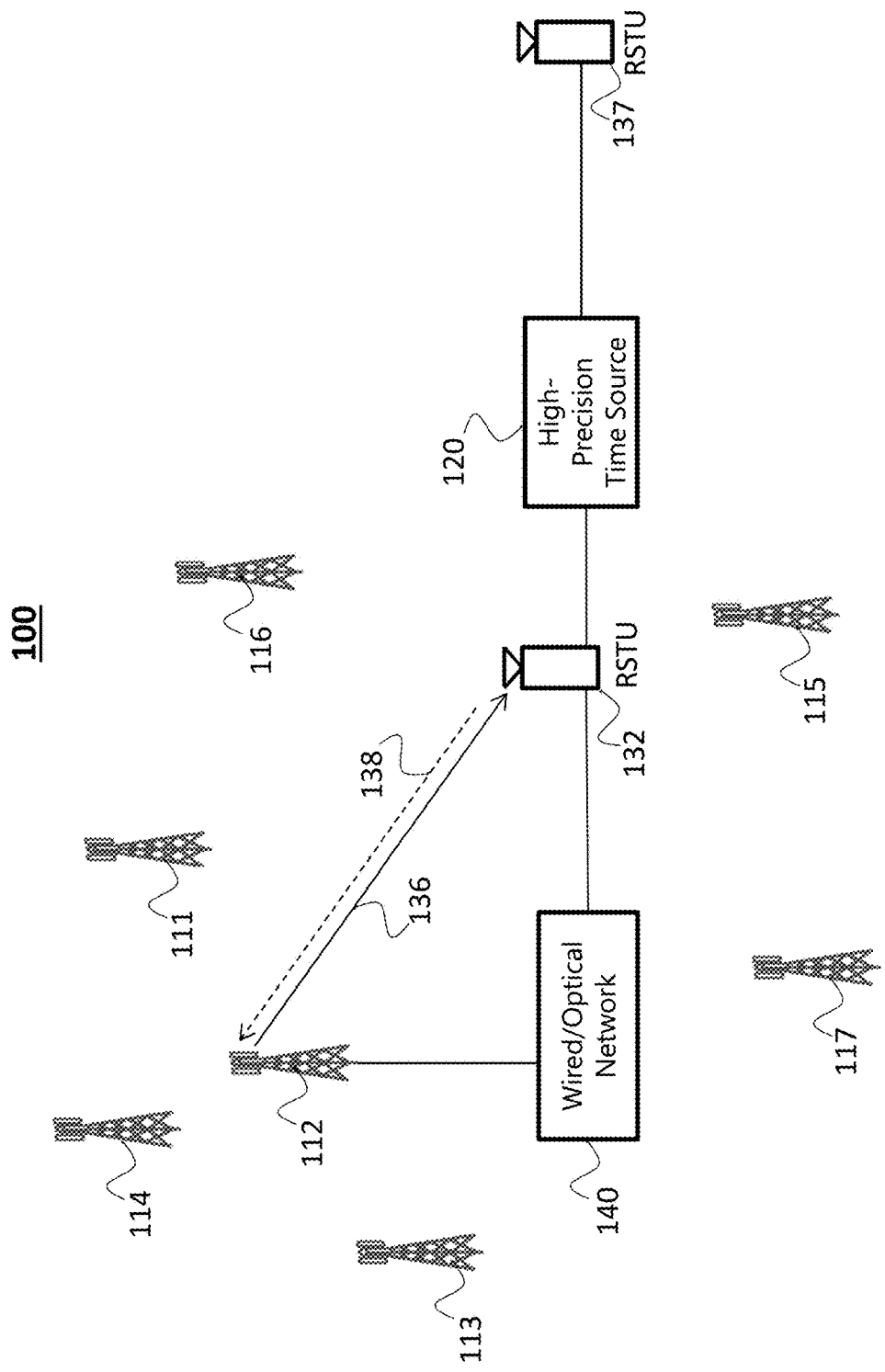
FIG. 1 depicts a system including multiple base stations and radio signal timestamping units (RSTUs) in accordance with an example embodiment.

Systems, devices and methods are disclosed for generating accurate timing information for wireless communications signals that can be used to correct the clocks of base stations for wireless communications systems. The wireless communication signals are used to synchronize the base stations as well as to provide accurate timing information to other devices in the system. The disclosed technology relies on a Radio Signal Timestamping Unit (RSTU) to provide timing information to a plurality of other devices in the network. The RSTU has an internal clock that is precisely and accurately synchronized with a high-precision time source, such as Coordinated Universal Time (UTC) or any one of a number of other time sources. For example, the high-precision time source may be a GPS receiver, an atomic clock, a clock based on White Rabbit (further detailed below), or any other time source. The high-precision time source provides a reference time source to the RSTU that has a known or predictable delay that can be precisely computed.

The RSTU can receive a wireless signal containing timing information broadcast by a base station such as a cellular base station. Based on the received timing information, the current time at the RSTU, and a propagation delay between the base station and RSTU, the RSTU can accurately synchronize the base station to UTC or another time. The RSTU can communicate with the base station to provide timing correction information via a wireless connection to the base station. Additionally, or alternatively, in deployments where an existing fixed communications infrastructure such as wired or fiber-optic links exists between the base stations and between the base stations and external networks, such fixed infrastructure can be used to provide the timing correction information. The fixed communications infrastructure and/or wireless connection may pass through one or more networks including the Internet or through the "cloud" to the base station. In some implementations, the RSTU may provide a timestamp to the base station corresponding to the time that the base station time was received at the RSTU. From the timestamp and the distance between the RSTU and the base station, the base station can determine the clock error. In some implementations, the RSTU sends the propagation delay to the base station and in other implementations the base station already has the propagation delay or receives it another way.

The distance between the RSTU and the base station may be determined via multiple methods. For example, the distance may be determined from known coordinates for the base station and RSTU by requesting a list of base stations and their coordinates from the service provider operating the base stations. In another example, the base station coordinates may be determined by a GPS receiver internal to each base station. In yet another example, the base station coordinates may be determined at the time the base station is installed. In some implementations, the distance between the base station and the RSTU is determined using Google maps or other mapping software. In some implementations, the RSTU determines the distance from the RSTU position and the base station position, while in other implementations the distance is provided to the RSTU.

In some implementations, the RSTU may determine and provide a time error or a corrected time that can be used to correct the base station time. In some implementations, the RSTU may provide to another device or application information that is needed to provide timing correction, such as the timestamp, positions of the base station and RSTU, and the other device or application then determines the clock error or corrected time for correcting the base station clock.

One advantage of the disclosed technology is that timing synchronization of the existing base stations is improved without requiring expensive hardware modifications to the base stations. For example, in some implementations, only a software update at the base station is needed to enable the base station to receive timing information from an RSTU and to effectuate improved timing synchronization with a high level of accuracy. The disclosed solution provides additional cost saving by implementing one RSTU device that can serve many base stations. If the number of base stations that one RSTU can support is exceeded, another RSTU can be added to support additional base stations, or the original RSTU may be replaced with an RSTU able to support a larger number of base stations. In this way, an arbitrary number of base stations can be supported. Another advantage of the disclosed technology is the ability to provide timing correction with different granularity to different base stations based on different factors, such as the needs of each base station, or service fees paid. The timing correction can be provided on a regular or periodic basis, or can be adjusted dynamically depending on the base station needs, such as when the RSTU detects that a station's timing information is out of compliance to what is needed. In some implementations, when the RSTU detects that a base station is out of compliance, it can report the base station to the service provider to initiate maintenance. Still another advantage of the disclosed technology is that it provides a stand-alone timing network that decouples payload data from timing synchronization information, thereby reducing or eliminating the reliability concerns that are associated with network congestion issues. Furthermore, the disclosed solution is highly reliable and it can provide timing synchronization to indoor devices and networks. For example, one RSTU in a building can provide timing information and synchronization for all devices inside the building that are within communication range of the RSTU.

The disclosed technology provides accurate timing solutions, which in some instances can be a few nanoseconds or less down to the accuracy of the high-precision time source. By improving time synchronization, the efficient use of time and frequency resources is improved, thereby reducing the cost per bit transferred over the network. The accuracy of the timing synchronization at a base station can be controlled by how frequently the base station time is corrected. More frequent correction results in tighter synchronization. In this way, various levels of timing synchronization can be provided.

The disclosed technology can provide accurate timing information using an RSTU for different types of wireless signals, which in general can be referred to as signals of opportunity (SOP), such as Long Term Evolution (LTE), Low Power Wide Area Networks (LPWAN), LoRaWAN, WiFi, digital Radio/TV, as well as many others. The RSTU architecture includes a synchronization subsystem (fiber-optic, copper, or wireless) for referencing to an absolute timebase (e.g., GPS, UTC, etc.), a receiver subsystem that may handle multiple standards such as LTE, LoRaWAN, etc., a timestamping subsystem, and a timestamp broadcasting or transmission subsystem (fiber-optic, copper, or wireless). As will be described in further detail below, in operation, the RSTU uses a SOP Timestamp protocol (SOTP) to identify time/phase markers in existing signals (e.g. cyclic prefixes), manage a database of SOP base station coordinates, estimate SOP base station clock offsets based on SOP absolute time of arrival (TOA) that is corrected for SOP propagation delay inferred from SOP coordinates and RSTU coordinates (e.g., 'timestamp'=TOA minus delay correction), and handle broadcast of measured timestamps/base station clock offsets (e.g. using LTE network, fixed Ethernet network, nearby WiFi access points, etc.). Using such a system, wireless signals from unsynchronized base stations (e.g., LTE, LoRaWAN, WiFi, Digital RTV, etc.) can be synchronized (post-time-synchronization). As noted earlier, the solution allows for separate telecom and accurate clock functionality which maximizes system flexibility and reduces capital expenditures for the telecom business segment. It further supports a business case for Time as a Service (TaaS) service providers.

Various embodiments of the invention will now be described. The following description provides specific details for a thorough understanding and an enabling description of these embodiments. One skilled in the art will understand, however, that the invention may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments of the invention.

FIG. 1 depicts a system 100 of base stations and radio signal timestamping units (RSTUs) in accordance with an example embodiment. In the example of FIG. 1, system 100 includes an RSTU 132 that corrects the timing of multiple base stations such as base stations 111, 112, 113, 114, 115, 116, and 117. The base stations may be connected to form one or more networks and may provide data service wirelessly to end nodes within radio range of one or more base stations. End nodes include user equipment (not shown in FIG. 1) or any other wireless device. Different base station networks may provide data service to the same end nodes or different end nodes. While "base stations" are used as examples herein, the use of the phrase "base station" is not meant to necessarily invoke conformance to a particular standardized wireless protocol. In general, use of the phrase "base station" herein should be broadly interpreted to mean any device in a wireless network that can benefit from synchronization.

The disclosed system augments an existing communication network by the addition of an RSTU that is within the range of one or more base stations to receive wireless transmissions from those base stations. For example, RSTU 132 is within wireless range of one or more base stations such as base station 112. In operation, RSTU 132 receives from base station 112 via wireless connection 136 timing information corresponding to the time of the base station clock at the time of the transmission. The base station time received by RSTU 132 may be Network Identity and Time Zone (NITZ) information or other information indicative of the time at base station 112. Such timing information may be regularly transmitted by the base station as part of the normal operations of the base station in, for example, a 4G or a 5G mobile communication network. Thus, RSTU 132 may simply be positioned in a select location within the wireless transmission range of a plurality of base stations in the network. As detailed below, based on the base station time received, the propagation delay from base station 112 to RSTU 132, and the current time at the RSTU, an error in the timing information of the base station can be accurately determined. The time at the base station 112, if needed, may then be adjusted to within a predetermined accuracy of a high-precision time source 120.

Current time at the RSTU is set based on the reference time provided by the high-precision time source 120 and the propagation delay from the high-precision time source 120 to the RSTU 132. Although depicted in FIG. 1 as a wired connection, in other examples the high-precision time source may be connected to the RSTU 132 via a wireless radio channel or other interface with known or precisely determinable propagation delay. The propagation delay may be fixed and/or may be calibrated out.

In some embodiments, high-precision time source 120 may connect to one or more additional RSTUs such as RSTU 137 shown in FIG. 1. To provide accurate time synchronization information to a network, multiple RSTUs may be deployed such that there is at least one RSTU within range of base stations in the one or more base station networks. For example, RSTU 132 may be within range of base stations 111, 112, 113, 114, 115, 116, and 117. Accordingly, the clock of each base station may be corrected via RSTU 132 using the current time at the RSTU 132 at the time when a wireless signal was received at the RSTU, the time at each base station when the wireless signal was broadcast or transmitted to the RSTU, and the propagation delay between RSTU 132 and each base station. One RSTU can correct the time of as many base stations from which the RSTU is able to receive the base station time. As such, using an RSTU-based architecture, the base stations do not need another source of timing such as GPS at each base station, and the RSTU can provide all the information needed to accurately set the clock at each base station. Because the RSTU's clock is maintained accurately in accordance with the high-precision time source 120, a single entity or device within a large communication network synchronizes multiple base stations. Moreover, the delivery of timing information can be decoupled from the data networks, allowing an independent, and in some instances a redundant, mechanism for maintaining timing synchronization. High-precision time source 120 can be an accurate GPS receiver, a timing source that operates based on the White Rabbit protocol, a Global Navigation Satellite System (GNSS), or other timing source.

White Rabbit is the name of a collaborative project including CERN, GSI Helmholtz Centre for Heavy Ion Research, and other partners from universities and industry, which have developed a fully deterministic Ethernet-based network for general purpose data transfer and sub-nanosecond accuracy time transfer. White Rabbit provides sub-nanosecond synchronization accuracy, which formerly required dedicated hard-wired timing systems, with the flexibility and modularity of real-time Ethernet networks. For example, White Rabbit may be used to synchronize copper and fiber-optic based networks. A White Rabbit network may be used to provide timing and synchronization to a distributed electronic system, or be used to provide both timing and real-time data transfer. White Rabbit focuses on sub-nanosecond accuracy and synchronization of more than 1000 nodes via fiber or copper connections of up to 10 km of length. Its aim is to provide predictability and reliability by allowing the deterministic delivery of high priority messages, and relies on open source hardware and software to avoid vendor lock-in. One of the challenges of White Rabbit is that of cost-effectively getting the suitable fiber-based connectivity and associated/supporting equipment from the White Rabbit based timing source to the White Rabbit equipped base station location, including potential need for difficult and costly retrofit into previously-deployed environments Referring to FIG. 1, RSTU 132 receives the base station time from base station 112. RSTU 132 can accurately timestamp the received signal based because the RSTU has been synchronized to high-precision time source 120. The disclosed embodiments provide several options for correcting the base station time. In some implementations, the RSTU has, or can compute, the propagation delay between base station 112 and RSTU 132. Based on the base station time, the time-stamped base station time, and the propagation delay, the RSTU can determine the error in the base station time. For example, when base station 112 generates a timing message at time $T_{BS}$ based on a local clock and transmits it to RSTU 132, that message is received at RSTU 132 after a propagation delay $T_{prop1}$, where the RSTU local time is $T_{RSTU}$. The error in the base station's clock, $T_E$, can be determined as:

$$T_E = T_{BS} - T_{RSTU} + T_{prop1} \qquad \text{Equation (1).}$$

The RSTU may communicate a message to the base station to correct the base station time via a network such as a wireless communication channel such as a Global System for Mobile Communications (GSM) or other cellular or wireless link. In some implementations (as described in further detail below), communications from the RSTU to the base station can additionally, or alternatively, carried out using a wire cable, a fiber optic network, or another fixed infrastructure communication channel. It should be noted that the base station requires some processing time to determine the base station time, place the base station time into a message, and provide the message for broadcast. The RSTU also requires some finite time to process the received message from the base station and to timestamp the received message. These processing times may contribute a fixed timing error that may be calibrated out or otherwise accounted for when correcting the base station clock.

In some example embodiments, the calculated timing correction information which is the error in the base station clock (i.e., $T_E$ in Equation (1)) is provided to the base station 112. In other embodiments, the RSTU 132 may provide to base station 112 the base station time and the timestamp and allow the base station 112 to determine the correction based on the propagation delay $T_{prop1}$.

At the base station 112, one or more existing interfaces (e.g., at the base station bay) can be used to correct the base station time. For example, a control signal input to a controlled clock in the base station may be used, or the time may be corrected via a Precision Time Protocol (PTP) interface or message, or the time may be corrected by adjusting a pulse generator that generates 1 pulse per second, or by adjusting a time of day clock. PTP is detailed in the IEEE 1588 Standard released in 2008. It should be noted that the disclosed timing correction technology is not dependent on PTP or other standardized protocols. Rather, for base stations that are already equipped with standardized interfaces, those interfaces may be used as a mechanism (e.g., as a shell message) to deliver the timing correction information that is provided by the RSTU.

Figure 2:
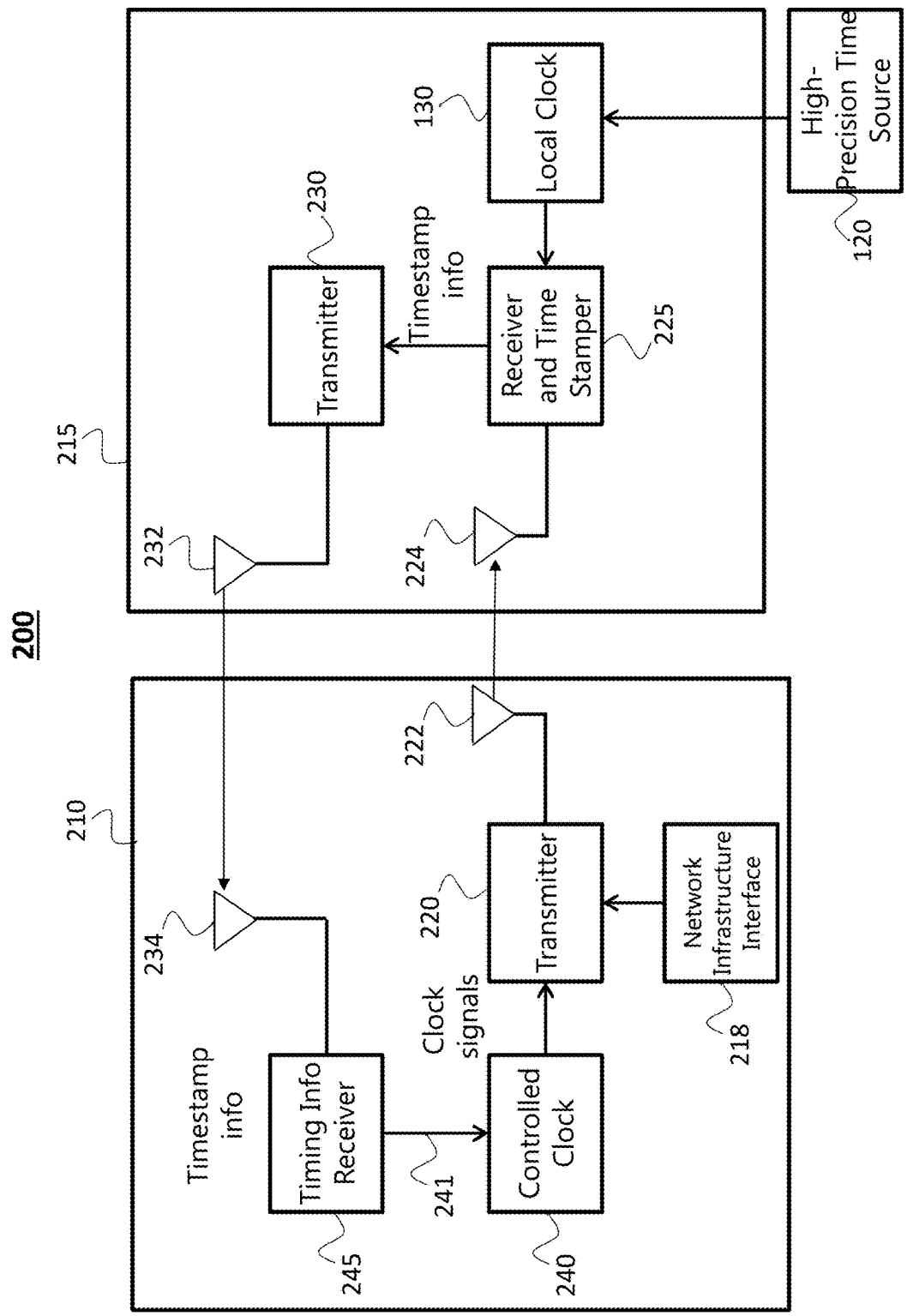
FIG. 2 is a block diagram of a system for time synchronization including an RSTU and a base station, in accordance with some example embodiments.

FIG. 2 is a block diagram of a system 200 for time synchronization including an RSTU 215 and a base station 210, in accordance with some example embodiments. The depicted system utilizes a wireless link from the RSTU to the base station. Base station 210 includes transmitter 220, network infrastructure interface 218, controlled clock 240, timing information receiver 245 and antenna 234. RSTU 215 includes antenna 232, transmitter 230, receiver and timestamper 225, and a local clock 130. The local clock is synchronized to a high-precision time source 120, which may be delivered to RSTU 215, as described earlier, or may be part of RSTU 215. It should be noted that base station 210 and RSTU 215 include additional components that are not depicted in FIG. 2 for simplicity. Moreover, the system 200 of FIG. 2 is greatly simplified by including a single base station. However, as described earlier, one of the many features and advantages of the disclosed technology is its ability to disseminate timing information from a single RSTU device to a plurality of base stations. Therefore, it is understood that additional base stations can be included in system 200 (as well as those in FIGS. 3 and 4).

Base station 210 includes transmitter 220 and antenna 222. Transmitter 220 transmits payload and control data such as Internet data, voice data, control data, authentication data or any combination of the foregoing data or other data to an end node or other receiver. Transmitter 220 also transmits base station timing information such as a NITZ message that is received by RSTU 215, as well as the end nodes and other receivers. Base station 210 may operate in accordance with one or more cellular standards such as GSM, 3G, 4G, LTE, or other cellular standards, and/or may operate according to another technology such as WiFi, Bluetooth or others.

Base station 210 includes network infrastructure interface 218 which may connect to other base stations via a base station network. Payload or any other of the above-mentioned data may be exchanged with base station 210 via network infrastructure interface 218. For example, base station 210 may receive Internet data that may be passed to base station 210 via network infrastructure interface 218 and then sent wirelessly to a cell phone via a 4G cellular connection by base station 210. User input at the cell phone may be passed to base station 210 and then sent to an Internet destination via the network infrastructure interface 218.

Base station 210 includes a controlled clock 240. Controlled clock 240 provides timing information such as the base station time which can be transmitted via transmitter 220 to other devices that are in communication range of base station 210. Controlled clock 240 accepts control signal 241 to adjust the time of controlled clock 240. For example, control signal 241 may cause an adjustment to the timing of a one-pulse-per-second signal provided by controlled clock 240 and used for timing at the base station. In another example, the control signal 241 may adjust a local oscillator such as a 10 megahertz (MHz) local oscillator. In another example, control signal 214 may adjust the time of day at controlled clock 240.

Due to local oscillator drift and phase noise at the base station 210, the time synchronization of controlled clock 240 may not match precisely the time to which is had been synchronized at an earlier time. Synchronization is improved by periodically or intermittently correcting controlled clock 240. As an illustrative example, controlled clock 240 may generate timing pulses at 1 pulse per second. Due to oscillator drift, the controlled clock 240 may have a timing stability of 1 part per billion (ppb). Thus, the controlled clock may drift by 1 nanosecond (ns) per second. In this example, in order to achieve timing synchronization of 10 ns or less, controlled clock 240 must be synchronized at least once every 10 seconds. In some implementations, the error in timing synchronization is kept to a predetermined timing error or less by periodically or intermittently correcting the controlled clock. In some implementations, the predetermined timing error is 100 nanoseconds. Smaller or larger predetermined timing errors can also be used and may depend on different price/performance levels to service users. The foregoing specific values are illustrative values. Any other values which may result in a different amount of time between needed synchronizations can be provided depending the requirements of the system or the end application.

Base station 210 includes timing information receiver 245 that is coupled to an antenna 234. Timing information receiver 245 receives information that can be used by base station 210 to correct the controlled clock via control signal 241. For example, timing information receiver 245 may transmit the base station time sent by base station 210, and receive a timing correction message received from RSTU 215 that includes the timestamped message and/or other timing correction information. A processor and memory containing executable code in base station 210 can operate to determine a time correction to apply to the base station time based on the base station time sent to the RSTU, and the timestamp or timing information received from the RSTU. The timing error may be used by the processor (upon execution of instructions stored in memory) to determine the time correction or to apply the time correction to the base station time at controlled clock 240.

In some implementations, timing information receiver 245 may have already been implemented as part of the base station to support end nodes such as user equipment and time synchronization may be achieved based on signals received from RSTU 215 without any hardware change to the base station 210. In some implementations, antenna 234 may be the same as antenna 222. Synchronization via RSTU 215 may be achieved via firmware and/or software changes at the base station (via e.g., remote configuration) that allows the received timing information to be decoded (and computed if needed), and applied or provided to the controlled clock 218.

RSTU 215 includes discrete hardware components such as receiver components, at least one processor, and other electronic components. RSTU 215 includes local clock 130 which is synchronized to a high-precision time source 120. Local clock 130 may be low drift and/or may be frequently synchronized to high-precision time source 120 via a wired or wireless interface. In some implementations, local clock 130 may be a GPS receiver with high timing accuracy, and high-precision time source 120 is provided by GPS satellites. In some implementations, local clock 130 may be synchronized via a fiber optic or wired cable to a precision time source such as one that implements the White Rabbit protocol, or other sources.

RSTU 215 includes receiver and timestamper 225. In some embodiments, receiver and timestamper 225 receives the base station time transmitted from base station 210 and records the time that the base station time was received. By recoding the time, the base station time is timestamped with the current time at the RSTU which has been synchronized to the high-precision time source 120. As an illustrative example, when the controlled clock 240 is precisely synchronized to the local clock 130, the timestamp on the base station time is equal to the time it took for the base station time to propagate to the receiver and timestamper 225. Other delays such as processing delays may further delay the time in the timestamp. Processing delays may be fixed and may be calibrated out of the timestamp. Receiver and timestamper 225 may include a processor and memory containing executable instructions and/or may include hardware to timestamp received signals such as the base station time. Hardware includes antenna 224 and a radio receiver to receive the timing information from the base stations. It should be noted that for facilitating the understanding of the disclosed technology, FIG. 2 shows separate RSTU antennas 224 and 232. It is, however, understood that the same antenna can be used by receiver and time stamper 225 and transmitter 230. FIG. 2 shows separate base station antennas 222 and 234. It is also understood that the same antenna can be used by timing information receiver 245 and transmitter 220.

Referring to FIG. 2, RSTU 215 includes transmitter 230 and antenna 232. In some implementations, the RSTU transmitter transmits the timestamped base station timing information from base station 210 to the base station time info receiver 245. The timestamped base station timing information is used by the base station to adjust the controlled clock 240 via control signal 241. For example, transmitter 230 may transmit the base station time received from base station 210 and the timestamp corresponding to when the base station time was received at the receiver and timestamper 225. In this example, the propagation delay may also be sent to the base station 210 if it is not otherwise known at the base station 210. The base station 210 can then determine the correction needed based on the base station time received, the timestamp, and the propagation delay between the RSTU 215 and base station 210. In an alternate implementation, a processor and memory containing executable code at transmitter 230 or receiver and timestamper 225 determines a time correction value (representing the timing error) and transmits it to the base station 210 via transmitter 230 and antenna 232. The timing correction value may then be used by the processor, memory and executable instructions at base station 210 to correct the base station time. In some embodiments, the communication of the timestamped base station timing information to the base station or the communication of the timing error to the base station is encrypted to allow secure transmission of timing information and related communications between base station 210 and RSTU 215. Such encrypted signaling can thwart potential spoofing and eavesdropping attacks.

In some implementations, transmitter 230 is a cellular device such as a GSM or other cellular transmitter that transmits time synchronization information to a GSM or other cellular receiver at timing information receiver 245. transmitter 230 and timing information receiver 245 may operate according to any other wireless communication protocol as well. As noted earlier, although FIG. 2 shows one RSTU 215 and one base station 210, RSTU 215 supports any number of base stations that are within range for reception by receiver and timestamper 225.

The frequency that timing correction information is transmitted between the RSTU and the base station is dependent, in part, on the actual accuracy and desired accuracy of the controlled clock at the base station. If the controlled clock has a tendency to drift and/or a higher controlled clock accuracy is required, the RSTU may transmit timing correction information more frequently. In contrast, if the controlled clock has a low drift rate, and/or a lower controlled clock accuracy is required, the RSTU may transmit timing correction information less frequently. In some embodiments, the update rate of the controlled clock may be tied to the price of the timing correction service offered by the RSTU operator. In doing so, the RSTU operator is able to offer different price/performance levels to service users.

Many variations of the features of the disclosed system are possible. In an example, base station location information does not need to be shared with the RSTU operator. Instead, the network operator can choose to compute the propagation delays between base stations and the RSTU itself using RSTU location information provided by the RSTU operator. The propagation delays may be provided to the RSTU operator, or may be maintained at the base station and thereby not disclosed to the RSTU operator. In another example, timestamp information can be conveyed in an encrypted way to ensure reliability and security of communications. In some variations, instead of the RSTU passing timing error or correction information to the base station, the RSTU passes the timing information to an end node such as a cellular handset. The handset may then pass the timing information to the base station.

Figure 3:
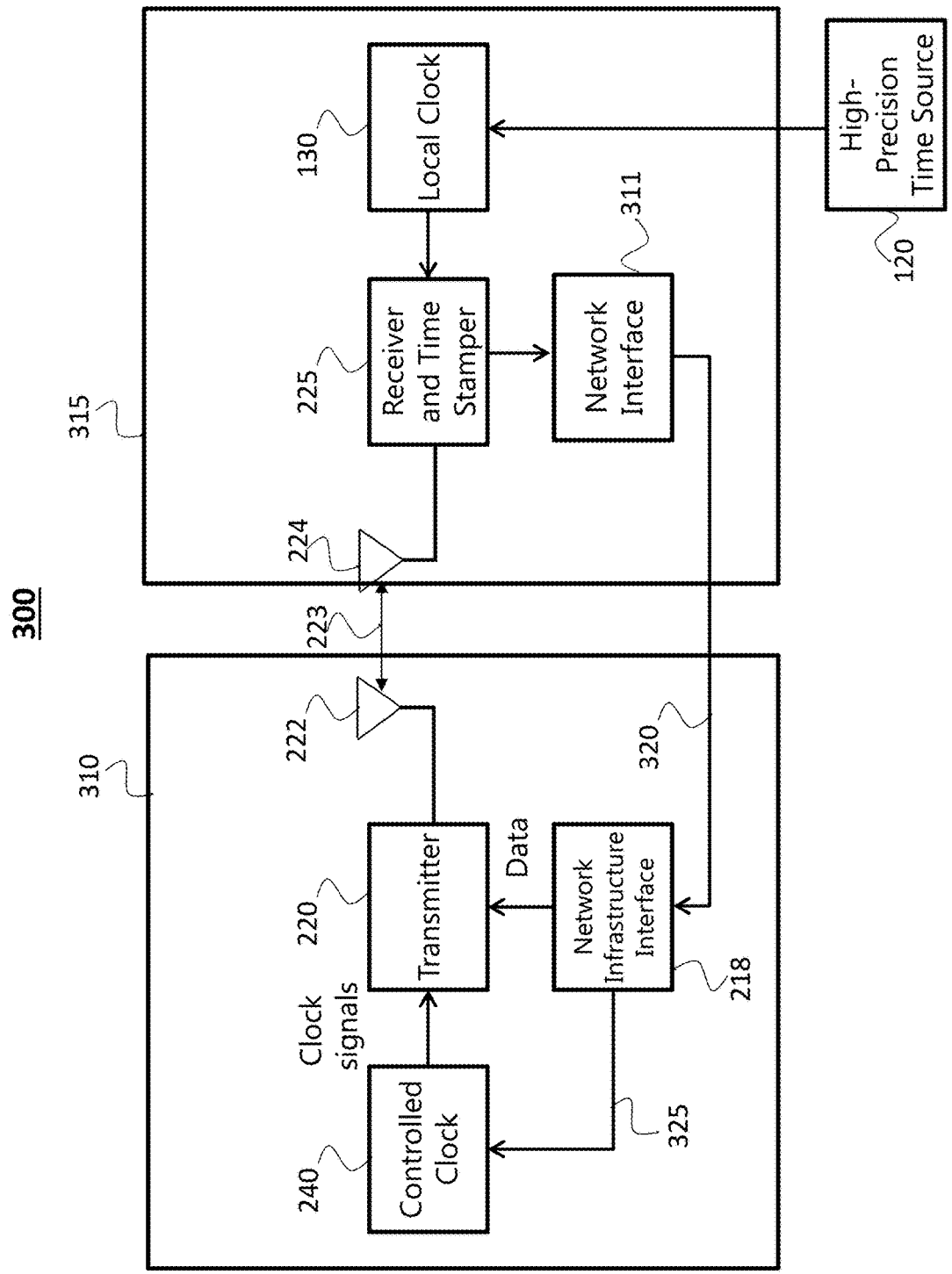
FIG. 3 is a block diagram of another system for time synchronization including RSTU and base station, in accordance with some example embodiments.

FIG. 3 is a block diagram of another system 300 for time synchronization including RSTU 315 and base station 310, in accordance with some example embodiments. The system 300 is applicable to implementations where a wired or fiber-optic interface is available to send timing information from the RSTU 315 to base station 310. The RSTU 315 is similar to RSTU 210 in FIG. 2 except that the timing correction information is sent from network interface 311 to network infrastructure interface 218 via a wired or fiber-optic link 320 (rather than the wireless link in FIG. 2 formed by transmitter 230, antennas 232 and 234, and timing information receiver 245). For example, receiver and time-stamper 225 may timestamp the received base station time and pass the timing information to network interface 311 wired to a network cable or a fiber-optic cable 320. Receiver and timestamper 225 may pass a timing error or a corrected base station time through network interface 311, cable 320, to network infrastructure interface 218. The timing information may pass over the Internet and/or through one or more networks not shown in FIG. 3 to get to network infrastructure interface 218. Network infrastructure interface 218 may pass timing correction information to controlled clock 240 and may include a processor and memory including executable instructions to determine the control signal 325 to cause correction of the controlled clock 240. In some implementations where the base station is equipped to receive PTP messages, the timing correction information may be formatted as a PTP-compatible message that is provided to controlled clock 240. Note that full support of the PTP protocol is not needed, and the message may be PTP compatible in the sense that it is used to adjust the clock only. Controlled clock 240 may accept the PTP compatible message which may cause a correction to the time (or to the pulse generator) of the controlled clock 240. Network infrastructure interface 218 may receive payload or other types of data as described above in addition to the timing information. The payload and other data may be passed to transmitter 220 to be transmitted to an end user such as a user equipment (not shown).

Figure 4:
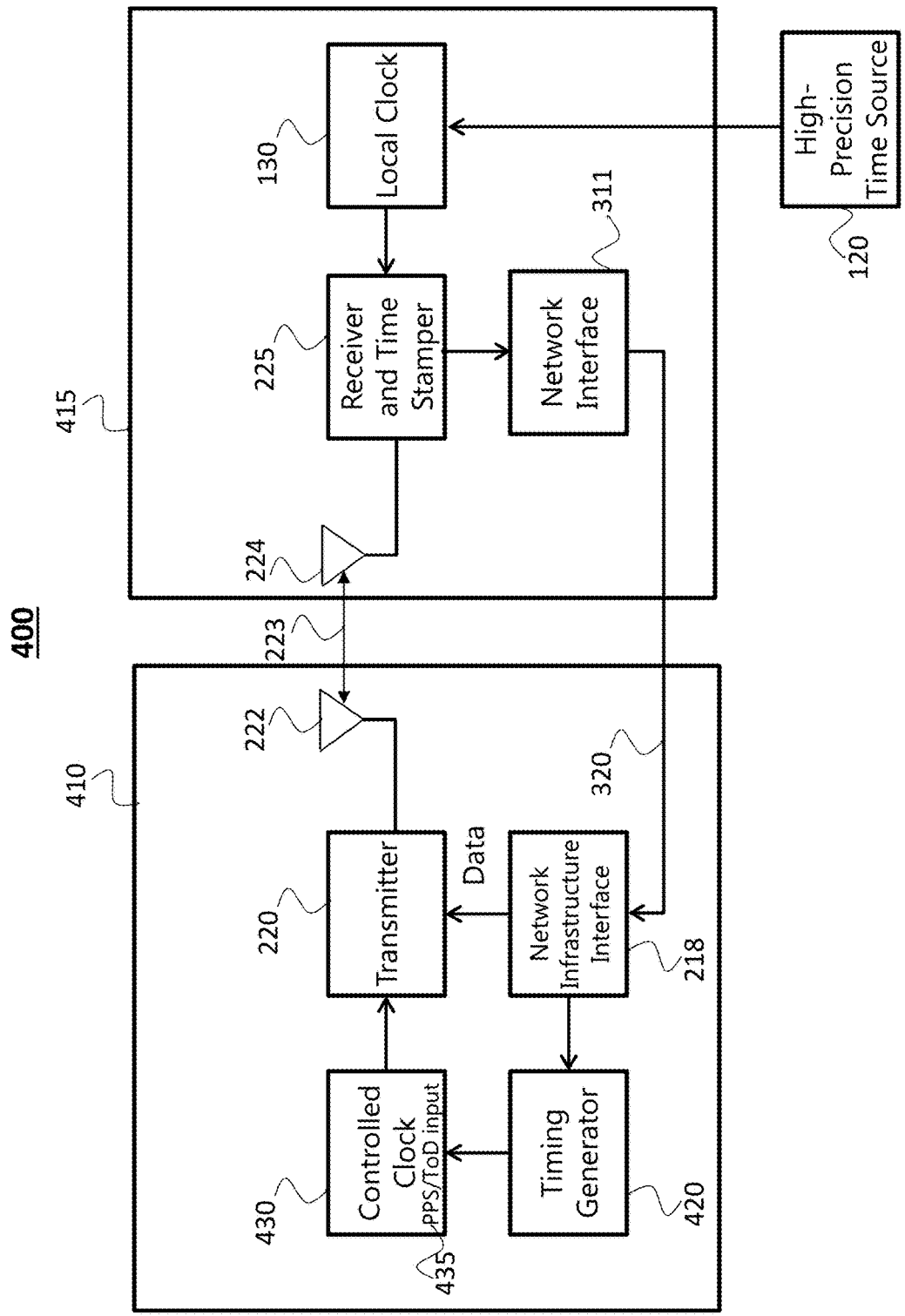
FIG. 4 is a block diagram of another system for time synchronization including RSTU and base station, in accordance with some example embodiments.

FIG. 4 is a block diagram of another system 400 for time synchronization including RSTU 415 and base station 410, in accordance with some example embodiments. The system 400 is used when a wired or fiber-optic interface is available to send timing information from the RSTU 415 to base station 410 and a timing generator 420 accepts timing correction input via the wired interface and generates a signal to adjust a controlled clock 430. RSTU 415 is similar to RSTU 315 in FIG. 3 except the timing correction information is provided to timing generator 420. Processing to determine an amount of time to adjust controlled clock 430 may be performed at RSTU 415 or elsewhere at base station 410. For example, processing may be performed at network infrastructure interface 218 or at timing generator 420. Timing generator 420 may provide a determination and/or translation to a predetermined signal type used by controlled clock 430 using the timing information. For example, timing generator 420 may be a timing pulse source that produces 1 pulse per second (pps) and/or may be a time of day (ToD) generator. Timing generator 420 may include a processor, memory, and executable instructions to determine a timing error or corrected time as described above and may adjust via PPS/ToD input 435 the timing of a 1 pps generator within timing generator 420, and/or adjust the ToD at timing generator 420. In some implementations where the base station is equipped with PTP functionality, timing generator 420 may generate a precision time protocol (PTP) message to correct controlled clock 430. In some implementations, network interface 311 may generate PTP messages that are passed through network infrastructure interface 218 through timing generator 420 to controlled clock 430. Controlled clock 430 may accept the PTP message which may cause a correction to the time (or pulse generator) of the controlled clock 430.

Figure 5:
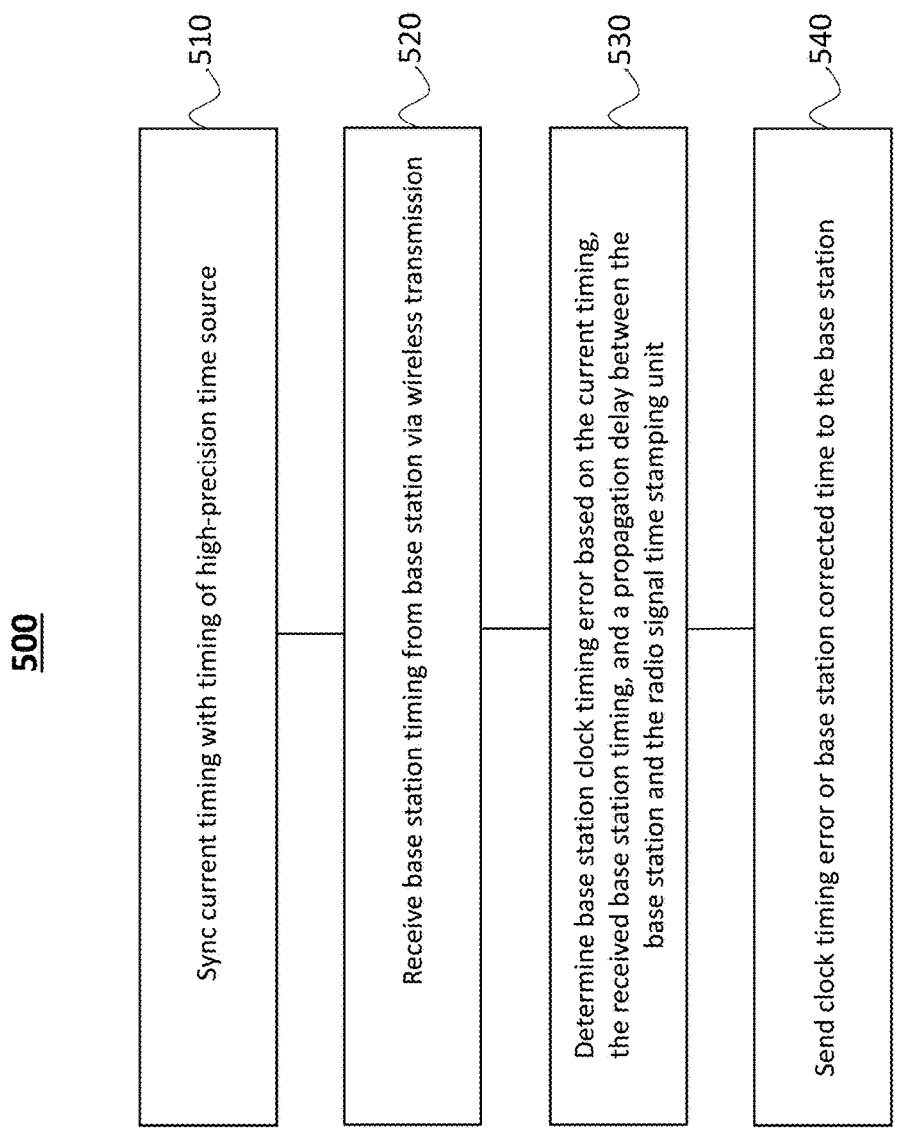
FIG. 5 is a flowchart of a process for timing synchronization, in accordance with some example embodiments.

FIG. 5 is a flowchart of a process for timing synchronization, in accordance with some example embodiments. The process is performed at a radio signal timestamping unit (RSTU). At a block 510, the RSTU synchronizes the current time of a local clock with a high-precision time source. At a block 520, the RSTU receives a base station time from a base station via a wireless transmission. At a block 530, the RSTU determines the base station clock error based on the local clock time, the received base station time, and a known or calculated propagation delay between the base station and the RSTU. At a block 540, the clock error or the base station corrected time is sent to the base station to cause correction to the base station time.

The operations in FIG. 5 can be carried out in accordance with different options as described in this document. For example, at block 510, the RSTU synchronizes the current time of a local clock with a high-precision time source, corrected for the propagation delay from the high-precision time source to the RSTU. The propagation delay, t, is related to the distance between the RSTU and the high-precision time source (or length of cable/fiber), d, the speed of light, c ($3 \times 10^8$ meters per second), and the index of refraction of the transmission medium, n, as $$t = \frac{d}{c/n}.$$

For example, when the RSTU is 1000 meters away from the high-precision time source, and the propagation speed (c/n) of the timing information carried from the high-precision time source is $3 \times 10^8$ meters/sec, the time that the high-precision time source information arrives at the RSTU, the time is 3333 nanoseconds later than the correct current time. Because the propagation between the high-precision time source and the RSTU is known and the propagation speed is known, the time at the local clock at the RSTU can be accurately set to the time of the high-precision time source. The propagation delay between the high-precision time source may be provide to the RSTU, or can be determined by the RSTU based on a known distance between the high-precision time source and the RSTU and propagation speed between them.

At block 520, the RSTU receives a base station time from a base station via a wireless transmission. The RSTU receives the base station time from the base station and timestamps it. The RSTU can accurately timestamp the received signal because the RSTU local clock has been synchronized to a high-precision time source.

At block 530, the RSTU determines the base station clock error based on the local clock time, the received base station time, and the propagation delay between the base station and the RSTU. There are several options for determining the base station clock error. In some implementations, the RSTU knows the exact geographic locations of the base stations which enable the RSTU to calculate the propagation delay between the base station and RSTU. In some implementations, the propagation delay is provided by the base station network operator to the RSTU operator. Based on the base station time, the time-stamped base station time, and the propagation delay, the RSTU can determine a timing error, such as $T_E$ detailed above with respect to Equation (1). The RSTU may provide the timing correction information to the base station time via a network using a wire cable, a fiber optic network, or wireless communication channel such as a GSM cellular link. The RSTU may alternatively provide raw timing information to the base station, where the base station is configured to compute the proper correction and apply it locally to its clock.

At block 540, the clock error or the base station corrected time is sent to the base station. The clock error or the corrected base station time is used to correct the base station time at the base station. In some embodiments, the RSTU may alternatively provide to the base station the base station time and the timestamp. The base station may determine the correction that is to be applied to the controlled clock based on the propagation delay $T_{prop1}$, the base station time transmitted to the RSTU, and the timestamp. The base-station-calculated clock correction is then used to correct the base station time. One or more existing interfaces at the base station may be used to correct the clock. For example, a control signal input to a controlled clock in the base station may be used, or the time may be corrected via a PTP message, or a clock that generates 1 pulse per second or a time of day clock may be adjusted.

Figure 6:
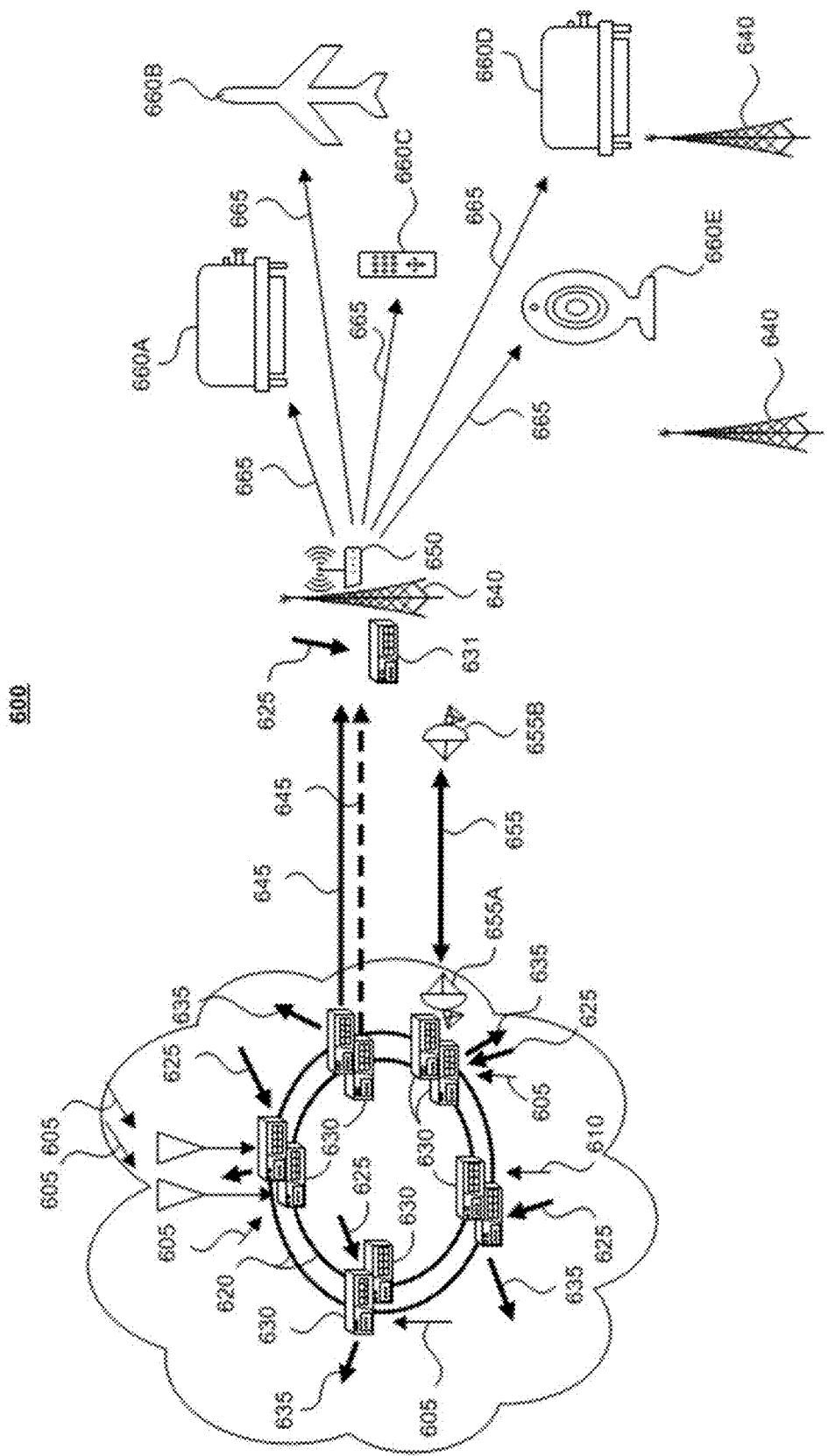
FIG. 6 depicts a system architecture of a wired and wireless network with timing synchronization, in accordance with some example embodiments.

FIG. 6 depicts a system architecture 600 of a wired and wireless network with timing synchronization, in accordance with some example embodiments. In the example of FIG. 6, redundant fiber rings 620 include timing nodes 630 located around the rings. The fiber rings may be dedicated or non-dedicated optical fiber rings. Each ring may support bidirectional data flow. Each timing node 630 provides precision timing and sync based on the CERN White Rabbit approach described above. A high-precision time source may be provided to the timing nodes via input(s) 605 which may include a UTC time input from an atomic clock, National Institutes of Standards (NIST) clock, U.S. Naval Observatory master clock, GPS, or other reference source time. An external interface 635 to each timing node 630 allows time to be provided as UTC Time as a Service (TaaS) to other network devices or nodes over a Network Timing Protocol (NTP) or a Precision Time Protocol (PTP) over Layer 2/3. Fiber rings 620 may provide fiber optic distribution to a timing node 631 outside the rings via fibers 645, wired connection, or microwave backhaul 655, 655A, and 655B. In some implementations, timing synchronization across fibers 645 and backhaul 655 may have less than 1 ns variation between fiber rings 620 and timing node 631.

An RSTU 650 may be co-located with timing node 630. Wireless base station 640 may also be co-located with timing node 631. Base station 640 may communicate with one or more end nodes such as small cell 660A, aircraft/drone 660B, user cellular user equipment 660C, other radios 660D, and/or Internet of things (IoT) device 660E. RSTU 650 may receive timing information from one or more of the end nodes and may enable synchronization of the end nodes to RSTU 650. Base stations 640 may also be synchronized to RSTU 650 as detailed above. The precise timing information provided by the RSTU 650 allows enhanced services to be offered to end node devices 660. For example, the precise timing information facilitates position determination technologies to more accurately identify the locations of end nodes. The precise timing information also allows for enhanced security solutions to be provided to end nodes.

Figure 7:
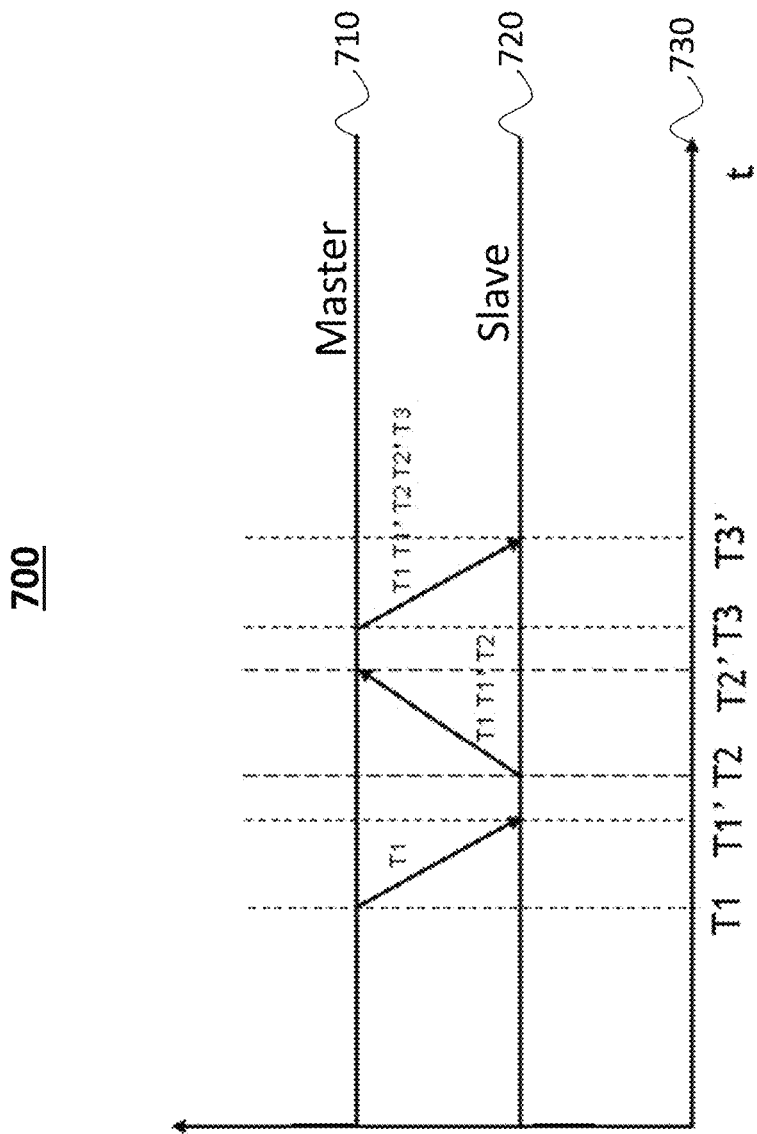
FIG. 7 depicts a timing diagram that illustrates how a PTP input can be used to provide timing correction information that is obtained by an RSTU, in accordance with some example embodiments.

As described earlier, many base stations have one or more external inputs to control the internal clock, and some base stations may have a PTP input. In some cases, the base station may require a piece of additional hardware that converts the timestamp information to a suitable 1-pulse-per-second or a Time-of-Day (ToD) signal. FIG. 7 depicts a timing diagram that illustrates how a PTP input can be used to provide timing correction information that is obtained by an RSTU in accordance with some example embodiments. In FIG. 7, the RSTU line is depicted as master 710, and the base station represented by slave 720.

At $T_1$ the master sends a message including a timestamp ($T_1$) representing the time that the message was sent to the slave. At $T_1'$ the message (including timestamp $T_1$) is received at the slave 720. The slave 720 timestamps the message when received. At T2, the slave sends a message to the master that is received at the master at $T_2'$ and is timestamped. These times are related to the transit time, d, between the master and slave, and the difference, o, between the master clock and slave clock, and can be mathematically expressed as: $T_1'-T_1=o+d$, and $T_2'-T_2=-o+d$. Combining these equations, o may be expressed as $o=\frac{1}{2}(T_1'-T_1-T_2'+T_2)$. The base station tries to remove clock offset, o.

In a first method, the base station sends timestamps $T_1'$ and $T_2$ to the RSTU. RSTU then computes $T_2=2o+T_2'+T_1-T_1'$. Consequently, the PTP offset received by the base station becomes $o'=o$, as desired. In a second method, the RSTU sends a timestamp $T_2'=2o$, and the base station software, before computing o' from the PTP timestamps, make the replacements $T_1\rightarrow 0, T_1'\rightarrow 0, T_2\rightarrow 0$. As a result, the base station PTP client will find the result $o'=2o/2=o$, as desired. Using these methods, only software upgrades to base stations are needed to implement the described timing correction, with no additional hardware.

Figure 8:
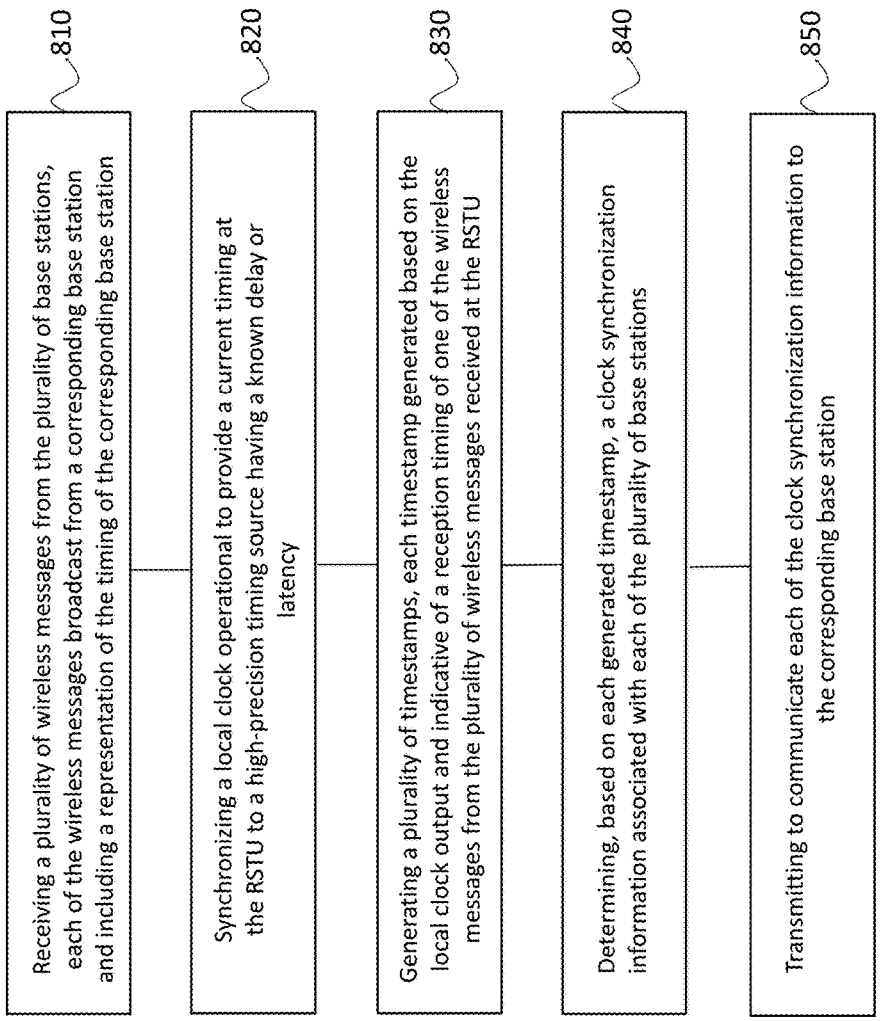
FIG. 8 illustrates a flowchart of a process performed at a RSTU for determining a clock error at a base station, in accordance with some example embodiments.

FIG. 8 illustrates a flowchart of a process 800 performed at a RSTU for determining a clock error at a base station, in accordance with some example embodiments. The process is a method of time synchronizing a wireless network including a radio signal timestamping unit (RSTU) and a plurality of base stations. The foregoing description of the RSTU and its operations, and the base stations and their operations, may be included in, or enhance, the following process 800 in any combination. At 810, the RSTU receives a plurality of wireless messages from the plurality of base stations. Each of the wireless messages is broadcast from a corresponding base station and includes a time value of the corresponding base station. At 820, a local clock operational to provide a current time value at the RSTU is synchronized to a high-precision time source. At 830, a plurality of timestamps is generated where each generated timestamp is based on the local clock output and is indicative of a reception time of one of the wireless messages from the plurality of wireless messages received at the RSTU. At 840, a clock synchronization information associated with each of the plurality of base stations is determined based on each generated timestamp. At 850, each of the clock synchronization information is transmitted to the corresponding base station.

Figure 9:
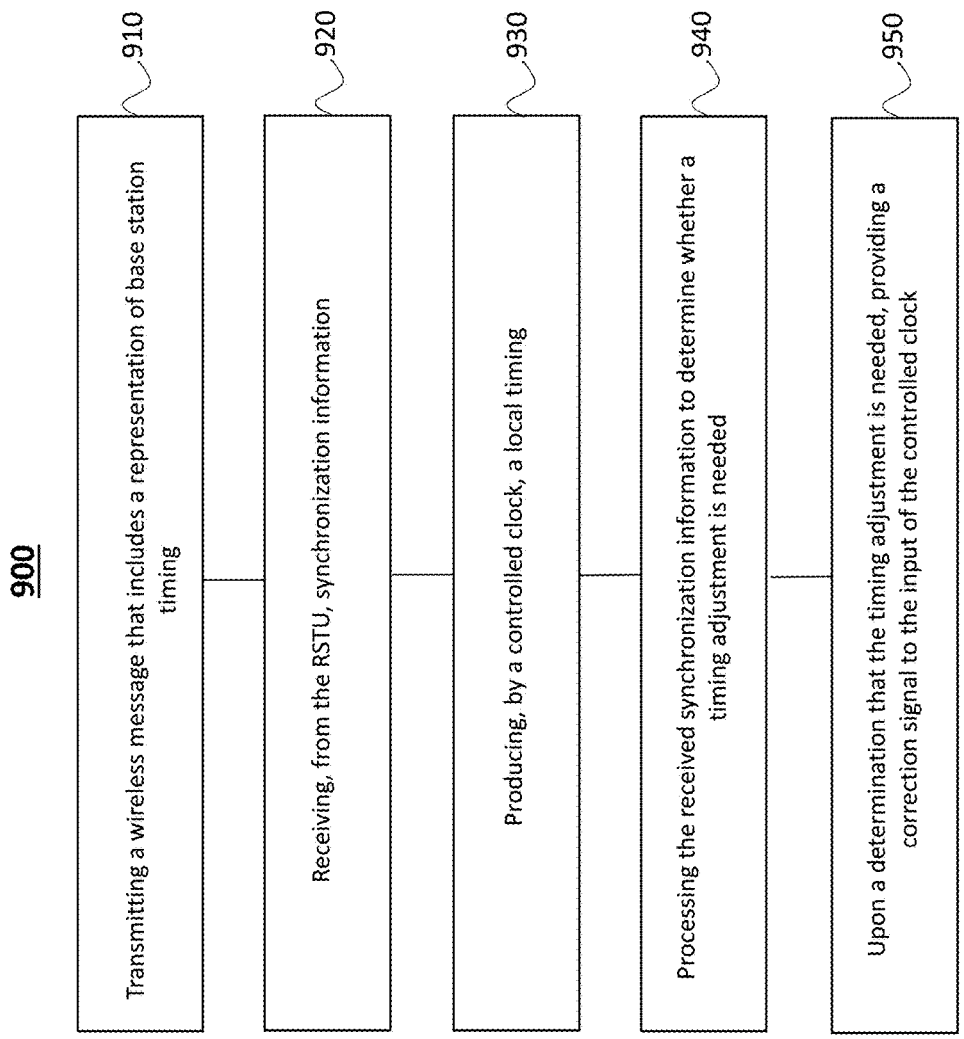
FIG. 9 illustrates a flow chart of a process for determining a clock error at the base station, in accordance with some example embodiments.

FIG. 9 illustrates a flow chart of a process 900 for determining a clock error at the base station, in accordance with some example embodiments. The process is a method performed at a plurality of base stations for time synchronizing a wireless network including a radio signal timestamping unit (RSTU) and the plurality of base stations. The foregoing description of the RSTU and its operations, and the base stations and their operations, may be included in, or enhance, the following process 800 in any combination. At 910, a wireless message that includes a base station time value is transmitted to the RSTU. At 920, synchronization information is received from the RSTU. At 930, a local time value is produced by a controlled clock. At 940, the received synchronization information is processed to determine whether a clock adjustment is needed. At 950, upon a determination that the clock adjustment is needed, a correction signal to the input of the controlled clock is provided to cause clock adjustment.

One aspect of the disclosed subject matter relates to a RSTU for providing time synchronization for a wireless network including a plurality of base stations. The RSTU includes a receiver to receive a plurality of wireless messages from the plurality of base stations. Each of the wireless messages is broadcast from a corresponding base station and includes a time value of the corresponding base station. The RSTU also includes a local clock operational to provide a current time value at the RSTU, the local clock being synchronized to a high-precision time source. The RSTU further includes a processor and a memory having instructions stored thereupon; the processor is coupled to the local clock. The instructions, upon execution by the processor cause the processor to generate a plurality of timestamps, where each timestamp is generated based on a local clock output value indicative of a reception time of one of the wireless messages from the plurality of wireless messages received at the RSTU, and/or based on each generated timestamp. The instructions, upon execution by the processor also cause the processor to determine clock synchronization information associated with each of the plurality of base stations. The RSTU additionally includes a transmitter to communicate each of the clock synchronization information to the corresponding base station.

The RSTU may include the following features in any combination. A first clock synchronization information associated with a first base station that is determined based on: a first timestamp indicative of a reception time of a first wireless message from the first base station at the RSTU, a free-space propagation delay associated with travel time of the first wireless message from the first base station to the RSTU, and a first time value of the first base station included in the first wireless message. The memory includes information indicative of geographic locations of at least a subset of the plurality of base stations including the first base station, and the free-space propagation delay associated with the first wireless message is determined based on a computed distance between a geographic location of the RSTU and the geographic location of the first base station. The memory includes information indicative a distance between the RSTU and the first base station, and the free-space propagation delay associated with the first wireless message is determined based on the distance. The first clock synchronization information includes a timing error value indicative of an amount of correction to a clock of the first base station. Clock synchronization information provided to a second base station of the plurality of base stations includes a timestamp indicative of a reception time of a wireless message from the second base station at the RSTU and a time value of the second base station included in the second wireless message, without providing a free-space propagation delay associated with travel time of the wireless message from the second base station to the RSTU. Clock synchronization information provided to at least one base station enables adjustment of a pulsed timing source or a time of day clock at the at least one base station. The transmitter is configured to communicate a plurality of clock synchronization information to corresponding base stations via wireless transmission. The wireless transmission is conducted in accordance with one of: a 4G, a 5G, a GSM, or a WiFi transmission protocols. The transmitter is configured to communicate clock synchronization information to corresponding base stations via a network infrastructure communication channel that includes at least one of a fiber optic or a copper cable transmission medium. The processor is further configured to generate, for at least a subset of the plurality of base stations, clock synchronization information at periodic or irregular intervals based on a plurality of wireless messages received from the subset of base stations.

The transmitter is further configured to transmit the clock synchronization information to a first base station of the subset of base stations more often than to a second base station of the subset of base stations. A rate of transmission of the clock synchronization information to at least one base station is determined in accordance with a clock accuracy requirement associated with the at least one base station. A rate of transmission of the clock synchronization information to at least one base station is selected to maintain a synchronization error between the RSTU and a clock at the least one base station to less than a predetermined timing error. For example, the predetermined timing error is 100 nanoseconds. The high-precision time source is one of a high-precision Global Positioning System (GPS) receiver or a timing source that operates in accordance with a White Rabbit protocol. The processor is configured to encapsulate at least the synchronization information for transmission to at least one base station in a format that conforms to Precision Timing Protocol. At least a subset of wireless messages received from the plurality of base stations include Network Identity and Time Zone (NITZ) information providing local time values associated with transmitting base stations. The processor is further configured to select a rate of transmission of the clock synchronization information to each of the plurality of base stations to maintain a synchronization error between the plurality of base stations to less than a predetermined synchronization error. The RSTU enables synchronization of at least a subset of the plurality of base stations that are not in communication range of a GPS satellite or are not equipped with a GPS receiver.

One aspect of the disclosed technology relates to a system that includes the RSTU as detailed above and a subset of the plurality of base stations. Each base station in the subset may include a transmitter to transmit a wireless message that includes a base station time value, a receiver to receive, from the RSTU, synchronization information, a controlled clock configured to produce a local time value at the base station and having an input that allows the controlled clock value to be adjusted. The base station includes processor and a base station memory comprising instructions stored thereupon. The instructions stored on the based station memory, upon execution by the base station processor, configure the base station processor to process the received synchronization information, and upon a determination that a clock adjustment is needed, provide a correction signal to the input of the controlled clock.

The system may include any of the following features. The correction signal provides a timing correction for a pulsed timing source or a time of day clock. The processor is configured to determine the correction signal based on a free-space propagation delay associated with the wireless message transmitted to, and received at, the RSTU, and the received synchronization information. The receiver at the base station is configured to receive the synchronization information through a wireless communication channel. At least some of the base stations in the subset (a) are positioned in a geographical location that is not in communication range of a GPS satellite or (b) are not equipped with a GPS receiver. At least some of the base stations in the subset are base stations in a standardized cellular network, and require only a software upgrade to enable the provision of the correction signal.

Another aspect, of the disclosed technology relates to a method of time synchronizing a wireless network that includes a radio signal timestamping unit (RSTU) and a plurality of base stations. The method includes receiving a plurality of wireless messages from the plurality of base stations, where each of the wireless messages is broadcast from a corresponding base station and includes a time value of the corresponding base station. The method further includes synchronizing a local clock operational to provide a current time value at the RSTU to a high-precision time source. The method further includes generating a plurality of timestamps, where each timestamp is generated based on the local clock output and is indicative of a reception time of one of the wireless messages from the plurality of wireless messages received at the RSTU. The above noted method further includes determining, based on each generated timestamp, clock synchronization information associated with each of the plurality of base stations, and transmitting each of the clock synchronization information to the corresponding base station.

The method may include the following features in any combination. A first clock synchronization information associated with a first base station is determined based on: a first timestamp indicative of a reception time of a first wireless message from the first base station at the RSTU, a free-space propagation delay associated with travel time of the first wireless message from the first base station to the RSTU, and a first time value of the first base station included in the first wireless message. First clock synchronization information includes a timing error value indicative of an amount of correction to a clock of the first base station. Clock synchronization information is provided to a second base station of the plurality of base stations and includes a timestamp indicative of a reception time of a wireless message from the second base station at the RSTU and a time value of the second base station included in the second wireless message, without providing a free-space propagation delay associated with travel time of the wireless message from the second base station to the RSTU. Clock synchronization information provided to at least one base station enables adjustment of a pulsed timing source or a time of day clock at the at least one base station. Transmitting each of the clock synchronization information to the corresponding base station can include communicating a plurality of clock synchronization information to corresponding base stations via wireless transmission and/or communicating a plurality of clock synchronization information to corresponding base stations via a network infrastructure communication channel that includes at least one of a fiber optic or a copper cable transmission medium. Generating a plurality of timestamps can include generating, for at least a subset of the plurality of base stations, clock synchronization information at periodic or irregular intervals based on a plurality of wireless messages received from the subset of base stations. Transmitting each of the clock synchronization information to the corresponding base station can include transmitting the clock synchronization information to a first base station of the subset of base stations more often than to a second base station of the subset of base stations. A rate of transmission of the clock synchronization information to at least one base station is determined in accordance with a clock accuracy requirement associated with the at least one base station. A rate of transmission of the clock synchronization information to at least one base station is selected to maintain a synchronization error between the RSTU and a clock at the least one base station to less than a predetermined timing error, such as 100 nanoseconds. The high-precision time source can be one of a high-precision Global Positioning System (GPS) receiver or a timing source that operates in accordance with a White Rabbit protocol. The method further includes encapsulating at least the synchronization information for transmission to at least one base station in a format that conforms to Precision Timing Protocol. At least a subset of wireless messages received from the plurality of base stations include Network Identity and Time Zone (NITZ) information providing local time values associated with transmitting base stations. The method further includes selecting a rate of transmission of the clock synchronization information to each of the plurality of base stations to maintain a synchronization error between the plurality of base stations to less than a predetermined synchronization error.

Another aspect of the disclosed technology relates to a method performed at a plurality of base stations in communication with a radio signal timestamping unit (RSTU). The method includes transmitting a wireless message that includes a base station time value, receiving, from the RSTU, a synchronization information, producing, by a controlled clock, a local time value, processing the received synchronization information to determine whether a clock adjustment is needed, and upon a determination that the clock adjustment is needed, adjusting providing a correction signal to the input of the controlled clock.

As may be referenced in this patent document, a computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data. Computer readable media suitable for storing computer program instructions and data include all forms of non-volatile memory, media and non-transitory memory devices, including by way of example semiconductor memory devices, e.g., EPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

The disclosed embodiments, the functional operations, and modules described in this document can be implemented in digital electronic circuitry, or in computer software, firmware, or hardware, including the structures disclosed in this document and their structural equivalents, or in combinations of one or more of them. The disclosed embodiments can be implemented as one or more computer program products, i.e., one or more modules of computer program instructions encoded on a non-transitory computer readable medium for execution by, or to control the operation of, a data processing apparatus. The computer readable medium can be a machine-readable storage device, a machine-readable storage substrate, a memory device, a composition of matter effecting a machine-readable propagated signal, or a combination of one or more them. The term "computer" encompasses all apparatuses, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

What is claimed is:

1. A radio signal timestamping unit (RSTU) for providing time synchronization for a wireless network comprising a plurality of base stations, the RSTU comprising:
    a receiver to receive a plurality of wireless messages from the plurality of base stations, each of the wireless messages broadcast from a corresponding base station and including a time value of the corresponding base station;
    a local clock operational to provide a current time value at the RSTU, the local clock synchronized to a time source;
    a processor and a memory having instructions stored thereupon, the processor coupled to the local clock, the instructions upon execution by the processor causing the processor to:
        generate a plurality of timestamps, each timestamp generated based on a local clock output value indicative of a reception time of one of the wireless messages from the plurality of wireless messages received at the RSTU, and
        based on each generated timestamp, determine clock synchronization information associated with each of the plurality of base stations; and
    a transmitter to communicate each of the clock synchronization information to the corresponding base station, wherein the clock synchronization information provided to a second base station of the plurality of base stations includes a timestamp indicative of a reception time of a wireless message from the second base station at the RSTU and a time value of the second base station included in the wireless message from the second base station, without providing a free-space propagation delay associated with travel time of the wireless message from the second base station to the RSTU.

2. The RSTU of claim 1, wherein a first clock synchronization information associated with a first base station is determined based on:
    a first timestamp indicative of a reception time of a first wireless message from the first base station at the RSTU,
    a free-space propagation delay associated with travel time of the first wireless message from the first base station to the RSTU, and
    a first time value of the first base station included in the first wireless message.

3. The RSTU of claim 2, wherein:
    the memory includes information indicative of geographic locations of at least a subset of the plurality of base stations including the first base station, and
    the free-space propagation delay associated with the first wireless message is determined based on a computed distance between a geographic location of the RSTU and the geographic location of the first base station.

4. The RSTU of claim 2, wherein:
    the memory includes information indicative a distance between the RSTU and the first base station, and
    the free-space propagation delay associated with the first wireless message is determined based on the distance.

5. The RSTU of claim 2, wherein the first clock synchronization information includes a timing error value indicative of an amount of correction to a clock of the first base station.

6. The RSTU of claim 1, wherein clock synchronization information provided to at least one base station enables adjustment of a pulsed timing source or a time of day clock at the at least one base station.

7. The RSTU of claim 1, wherein the wireless transmission is conducted in accordance with one of: a 4G, a 5G, a GSM, or a WiFi transmission protocol.

8. The RSTU of claim 1, wherein the transmitter is configured to communicate the clock synchronization information to corresponding base stations via a network infrastructure communication channel that includes at least one of a fiber optic or a copper cable transmission medium, or via wireless transmission.

9. The RSTU of claim 1, wherein the processor is configured to generate, for at least a subset of the plurality of base stations, clock synchronization information at periodic or irregular intervals based on a plurality of wireless messages received from the subset of base stations, and wherein the transmitter is configured to transmit the clock synchronization information to a first base station of the subset of base stations more often than to a second another base station of the subset of base stations.

10. The RSTU of claim 9, wherein a rate of transmission of the clock synchronization information to at least one base station is determined in accordance with a clock accuracy requirement associated with the at least one base station.

11. The RSTU of claim 9, wherein a rate of transmission of the clock synchronization information to at least one base station is selected to maintain a synchronization error between the RSTU and a clock at the least one base station to less than a predetermined timing error.

12. The RSTU of claim 11, wherein the predetermined timing error is 100 nanoseconds.

13. The RSTU of claim 1, wherein the time source is one of a high-precision Global Positioning System (GPS) receiver or a timing source that operates in accordance with a White Rabbit protocol.

14. The RSTU of claim 1, wherein the processor is configured to encapsulate at least the synchronization information for transmission to at least one base station in a format that conforms to a Precision Timing Protocol.

15. The RSTU of claim 1, wherein at least a subset of wireless messages received from the plurality of base stations include Network Identity and Time Zone (NITZ) information providing local time values associated with transmitting base stations.

16. The RSTU of claim 1, wherein the processor is configured to select a rate of transmission of the clock synchronization information to each of the plurality of base stations to maintain a synchronization error between the plurality of base stations to less than a predetermined synchronization error.

17. The RSTU of claim 1, wherein the RSTU enables synchronization of at least a subset of the plurality of base stations that are not in communication range of a GPS satellite or are not equipped with a GPS receiver.

18. A system including the RSTU of claim 1 and a subset of the plurality of base stations, wherein each base station in the subset includes:
 a transmitter to transmit a wireless message that includes a base station time value;
 a receiver to receive, from the RSTU, synchronization information;
 a controlled clock configured to produce a local time value at the base station, and having an input that allows the controlled clock value to be adjusted; and
 a base station processor and a base station memory comprising instructions stored thereupon, the instructions stored on the based station memory and which, upon execution by the base station processor, configure the base station processor to process the received synchronization information, and upon a determination that a clock adjustment is needed, provide a correction signal to the input of the controlled clock.

19. A method of time synchronizing a wireless network including a radio signal timestamping unit (RSTU) and a plurality of base stations, the method comprising:
 receiving a plurality of wireless messages from the plurality of base stations, each of the wireless messages broadcast from a corresponding base station and including a time value of the corresponding base station;
 synchronizing a local clock operational to provide a current time value at the RSTU to a time source;
 generating a plurality of timestamps, each timestamp generated based on the local clock output and indicative of a reception time of one of the wireless messages from the plurality of wireless messages received at the RSTU,
 determining, based on each generated timestamp, clock synchronization information associated with each of the plurality of base stations; and
 transmitting each of the clock synchronization information to the corresponding base station, wherein the clock synchronization information provided to a second base station of the plurality of base stations includes a timestamp indicative of a reception time of a wireless message from the second base station at the RSTU and a time value of the second base station included in the wireless message from the second base station, without providing a free-space propagation delay associated with travel time of the wireless message from the second base station to the RSTU.

20. The method of claim 19, wherein a first clock synchronization information associated with a first base station is determined based on:
 a first timestamp indicative of a reception time of a first wireless message from the first base station at the RSTU,
 a free-space propagation delay associated with travel time of the first wireless message from the first base station to the RSTU, and
 a first time value of the first base station included in the first wireless message.

21. The method of claim 20, wherein the first clock synchronization information includes a timing error value indicative of an amount of correction to a clock of the first base station.

22. The method of claim 19, wherein clock synchronization information provided to at least one base station enables adjustment of a pulsed timing source or a time of day clock at the at least one base station.

23. The method of claim 19, wherein the transmitting communicates a plurality of clock synchronization information to corresponding base stations via a network infrastructure communication channel that includes at least one of a fiber optic or a copper cable transmission medium, or via wireless transmission.

24. The method of claim 19, wherein the generating includes generating, for at least a subset of the plurality of base stations, clock synchronization information at periodic or irregular intervals based on a plurality of wireless messages received from the subset of base stations, and wherein the transmitting includes transmitting the clock synchronization information to a first base station of the subset of base stations more often than to a second another base station of the subset of base stations.

25. The method of claim 24, wherein a rate of transmission of the clock synchronization information to at least one base station is determined in accordance with a clock accuracy requirement associated with the at least one base station.

26. The method of claim 24 wherein a rate of transmission of the clock synchronization information to at least one base station is selected to maintain a synchronization error between the RSTU and a clock at the least one base station to less than a predetermined timing error.

27. The method of claim 26, wherein the predetermined timing error is 100 nanoseconds.

28. The method of claim 19, wherein the time source is one of a high-precision Global Positioning System (GPS) receiver or a timing source that operates in accordance with a White Rabbit protocol.

29. The method of claim 19, further comprising:
 selecting a rate of transmission of the clock synchronization information to each of the plurality of base stations to maintain a synchronization error between the plurality of base stations to less than a predetermined synchronization error.

* * * * *